(12) United States Patent
Hamagishi et al.

(10) Patent No.: US 9,581,825 B2
(45) Date of Patent: Feb. 28, 2017

(54) THREE-DIMENSIONAL IMAGE DISPLAY DEVICE

(71) Applicant: Samsung Display Co., Ltd., Yongin (KR)

(72) Inventors: Goro Hamagishi, Hwaseong-si (KR); SeHuhn Hur, Yongin-si (KR); Kyungho Jung, Seongnam-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 14/635,688

(22) Filed: Mar. 2, 2015

(65) Prior Publication Data

US 2016/0004087 A1 Jan. 7, 2016

(30) Foreign Application Priority Data

Jul. 2, 2014 (KR) .................. 10-2014-0082565

(51) Int. Cl.
G02B 27/22 (2006.01)
H04N 13/04 (2006.01)

(52) U.S. Cl.
CPC ..... G02B 27/2214 (2013.01); H04N 13/0404 (2013.01); H04N 13/0415 (2013.01); H04N 13/0422 (2013.01)

(58) Field of Classification Search
CPC .. G02B 27/2214; G02B 27/225; G02B 27/22; H04N 13/0404; H04N 13/0409; H04N 13/0402; H04N 13/0445; H04N 13/00
USPC ............... 359/462, 463, 464, 466, 467, 477
See application file for complete search history.

(56) References Cited

U.S. PATENT DOCUMENTS

| 7,787,008 | B2 | 8/2010 | Fukushima et al. |
| 8,134,590 | B2 | 3/2012 | DeZwart et al. |
| 8,233,036 | B2 | 7/2012 | Park |
| 8,339,705 | B2* | 12/2012 | Hong .................. G02B 27/2214 348/59 |
| 8,384,747 | B2 | 2/2013 | Van Berkel |
| 8,493,439 | B2 | 7/2013 | Park |
| 2004/0252374 | A1* | 12/2004 | Saishu ............... G02B 27/2214 359/462 |
| 2011/0050683 | A1 | 3/2011 | Yun et al. |

(Continued)

FOREIGN PATENT DOCUMENTS

| JP | 2006-174258 | 6/2006 |
| JP | 2012-249060 | 12/2012 |

(Continued)

OTHER PUBLICATIONS

"Pixel," Merriam-Webster Online Dictionary, Jul. 20, 2016, http://www.merriam-webster.com/dictionary/pixel.*

Primary Examiner — Jade R Chwasz
(74) Attorney, Agent, or Firm — H.C. Park & Associates, PLC (57) ABSTRACT

A three-dimensional image display device includes a display panel including M×N pixels arranged in M rows by N columns, displaying kn viewpoint images, and configured to display a color image using L primary colors. The display panel also includes a viewpoint forming unit including L viewpoint forming devices arranged in a row direction and configured to separate the kn viewpoint images at different angles to project the kn viewpoint images on corresponding viewing zones.

20 Claims, 9 Drawing Sheets

(56) References Cited

U.S. PATENT DOCUMENTS

2013/0163078 A1    6/2013  Saito
2013/0194521 A1    8/2013  Whangbo et al.
2013/0208357 A1    8/2013  Saito

FOREIGN PATENT DOCUMENTS

KR    10-2009-0060061    6/2009
KR    10-2012-0095035    8/2012
KR    10-2016-0004475    1/2016

* cited by examiner

THREE-DIMENSIONAL IMAGE DISPLAY DEVICE

CROSS-REFERENCE TO RELATED APPLICATION

This application claims priority from and the benefit of Korean Patent Application No. 10-2014-0082565, filed on Jul. 2, 2014, which is hereby incorporated by reference for all purposes as if fully set forth herein.

BACKGROUND

Field

Exemplary embodiments relate to a display device. More particularly, exemplary embodiments relate to a three-dimensional image display device capable of displaying an image using an auto-stereoscopic method.

Discussion of the Background

An auto-stereoscopic display technology applied to a three-dimensional image display device displays a three-dimensional image without shutter glasses. A parallax barrier scheme and a lenticular lens scheme are widely used as auto-stereoscopic displays.

A three-dimensional image display device employing the parallax barrier scheme includes a parallax barrier, through which vertical lattice-shape openings are formed, disposed in front of a display panel including pixels arranged in rows by columns. The parallax barrier separates a right-eye image and a left-eye image, and respectively provides the right- and left-eye images to right and left eyes of an observer. Accordingly, the observer recognizes the three-dimensional image as a result of a binocular disparity in different images between the right- and left-eye images.

A three-dimensional image display device employing the lenticular lens scheme includes a lenticular lens sheet having a plurality of semi-cylindrical lenses arranged in a column direction and disposed on the display panel, instead of the parallax barrier having the vertical lattice shape.

In particular, a lenticular device, which is switchable between a two-dimensional mode and a three-dimensional mode, includes two substrates and a liquid crystal layer disposed between the two substrates. One of the two substrates includes electrodes configured to arrange liquid crystal molecules of the liquid crystal layer in lenticular lens form. The lenticular device is disposed in front of a display panel and switched between the two-dimensional mode and the three-dimensional mode by turning on or off a voltage applied to the electrodes.

The above information disclosed in this Background section is only for enhancement of understanding of the background of the inventive concept, and, therefore, it may contain information that does not form the prior art that is already known in this country to a person of ordinary skill in the art.

SUMMARY

Exemplary embodiments provide a three-dimensional image display device having high resolution.

Additional aspects will be set forth in the detailed description which follows, and, in part, will be apparent from the disclosure, or may be learned by practice of the inventive concept.

An exemplary embodiment of the inventive concept discloses a three-dimensional image display device including a display panel including a dot including M×N pixels arranged in M rows by N columns, displaying kn viewpoint images, and displaying a color image using L primary colors. The image display device also includes a viewpoint forming unit including L viewpoint forming devices arranged in a row direction and separating the kn viewpoint images in different angles to project the kn viewpoint images onto corresponding viewing zones. Each of the viewpoint forming devices has a pitch (P) satisfying the following Equation:

$$O < P \leq \frac{N \cdot Wh}{L}$$

in the row direction, where "Wh" denotes a width in the row direction of each of the pixels.

The foregoing general description and the following detailed description are exemplary and explanatory and are intended to provide further explanation of the claimed subject matter.

BRIEF DESCRIPTION OF THE DRAWINGS

The accompanying drawings, which are included to provide a further understanding of the inventive concept, and are incorporated in and constitute a part of this specification, illustrate exemplary embodiments of the inventive concept, and, together with the description, serve to explain principles of the inventive concept.

DETAILED DESCRIPTION OF THE ILLUSTRATED EMBODIMENTS

In the following description, for the purposes of explanation, numerous specific details are set forth in order to provide a thorough understanding of various exemplary embodiments. It is apparent, however, that various exemplary embodiments may be practiced without these specific details or with one or more equivalent arrangements. In other instances, well-known structures and devices are shown in block diagram form in order to avoid unnecessarily obscuring various exemplary embodiments.

In the accompanying figures, the size and relative sizes of layers, films, panels, regions, etc., may be exaggerated for clarity and descriptive purposes. Also, like reference numerals denote like elements.

When an element or layer is referred to as being "on," "connected to," or "coupled to" another element or layer, it may be directly on, connected to, or coupled to the other element or layer or intervening elements or layers may be present. When, however, an element or layer is referred to as being "directly on," "directly connected to," or "directly coupled to" another element or layer, there are no intervening elements or layers present. For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. Like numbers refer to like elements throughout. As used herein, the term "and/or" includes any and all combinations of one or more of the associated listed items.

Although the terms first, second, etc. may be used herein to describe various elements, components, regions, layers, and/or sections, these elements, components, regions, layers, and/or sections should not be limited by these terms. These terms are used to distinguish one element, component, region, layer, and/or section from another element, component, region, layer, and/or section. Thus, a first element, component, region, layer, and/or section discussed below could be termed a second element, component, region, layer, and/or section without departing from the teachings of the present disclosure.

Spatially relative terms, such as "beneath," "below," "lower," "above," "upper," and the like, may be used herein for descriptive purposes, and, thereby, to describe one element or feature's relationship to another element(s) or feature(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the exemplary term "below" can encompass both an orientation of above and below. Furthermore, the apparatus may be otherwise oriented (e.g., rotated 90 degrees or at other orientations), and, as such, the spatially relative descriptors used herein interpreted accordingly.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof Various exemplary embodiments are described herein with reference to sectional illustrations that are schematic illustrations of idealized exemplary embodiments and/or intermediate structures. As such, variations from the shapes of the illustrations as a result, for example, of manufacturing techniques and/or tolerances, are to be expected. Thus, exemplary embodiments disclosed herein should not be construed as limited to the particular illustrated shapes of regions, but are to include deviations in shapes that result from, for instance, manufacturing. For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the drawings are schematic in nature and their shapes are not intended to illustrate the actual shape of a region of a device and are not intended to be limiting.

Unless otherwise defined, all terms (including technical and scientific terms) used herein have the same meaning as commonly understood by one of ordinary skill in the art to which this disclosure is a part. Terms, such as those defined in commonly used dictionaries, should be interpreted as having a meaning that is consistent with their meaning in the context of the relevant art and will not be interpreted in an idealized or overly formal sense, unless expressly so defined herein.

Figure 1:
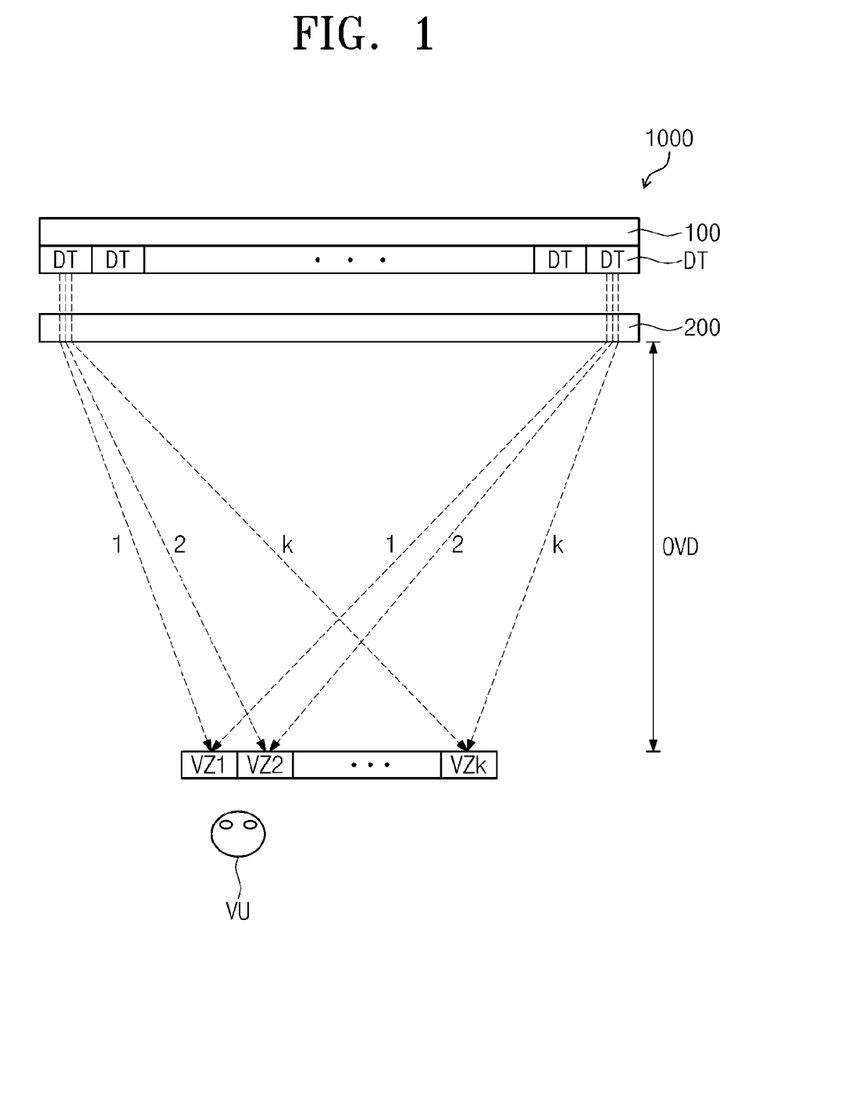
FIG. 1 is a view illustrating a three-dimensional image display device illustrating a three-dimensional image according to an exemplary embodiment.

FIG. 1 is a view illustrating a three-dimensional (3D) image display device 1000 displaying a 3D image according to an exemplary embodiment of the present disclosure.

Referring to FIG. 1, the 3D image display device 1000 includes a display panel 100 to display a two-dimensional (2D) image and a viewpoint forming unit 200 facing the display panel 100. The viewpoint forming unit 200 converts the 2D image to the 3D image.

The display panel 100 includes a plurality of dots DT. The dots DT are arranged in a row direction and a column direction, e.g., a matrix form. Each dot DT displays a plurality of viewpoint images. As an example, the viewpoint images are configured to include first to k-th viewpoint images 1 to k. The number of the viewpoint images kn may vary. For instance, the number of the viewpoint images kn may be 8, 12, or 16.

The viewpoint forming unit 200 refracts the first to k-th viewpoint images 1 to k in different angles when viewed in a plan view to project the first to k-th viewpoint images 1 to k on first to k-th viewing zones VZ1 to VZk, which are defined at a visible distance OVD from the viewpoint forming unit 200. The first to k-th viewing zones VZ1 to VZk are sequentially arranged in the row direction.

Accordingly, the first to k-th viewpoint images 1 to k respectively form a plurality of viewpoints. In this case, the number of the viewpoints may be substantially the same as that of the viewpoint images kn, and the first to k-th viewpoint images 1 to k of the dots DT respectively form the first to k-th viewpoints.

In more detail, the first viewpoint is configured to include the first viewpoint images 1 of the dots DT projected on the first viewing zone VZ1. Similarly, the second to k-th viewpoints are configured to include the second to k-th viewpoint images 2 to k projected on the second to k-th viewing zones VZ2 to VZk.

As shown in FIG. 1, a viewer VU recognizes the image displayed on the display panel 100 through the viewpoint forming unit 200 disposed between the display panel 100 and the observer 100. A left eye of the viewer VU recognizes the first viewpoint in the first viewing zone VZ1, and a right eye of the viewer VU recognizes the second viewpoint in the second viewing zone VZ2. Therefore, the viewer VU recognizes the first and second viewpoints, which are different from each other, through the left and right eyes, respectively, and thus, the viewer VU recognizes the 3D image according to binocular disparity between the left and right eyes.

When the viewer VU moves along the row direction, the viewer VU sequentially recognizes the different viewpoints through the left and right eyes. As a result, the viewer VU recognizes different 3D images while moving along the row direction.

Figure 2:
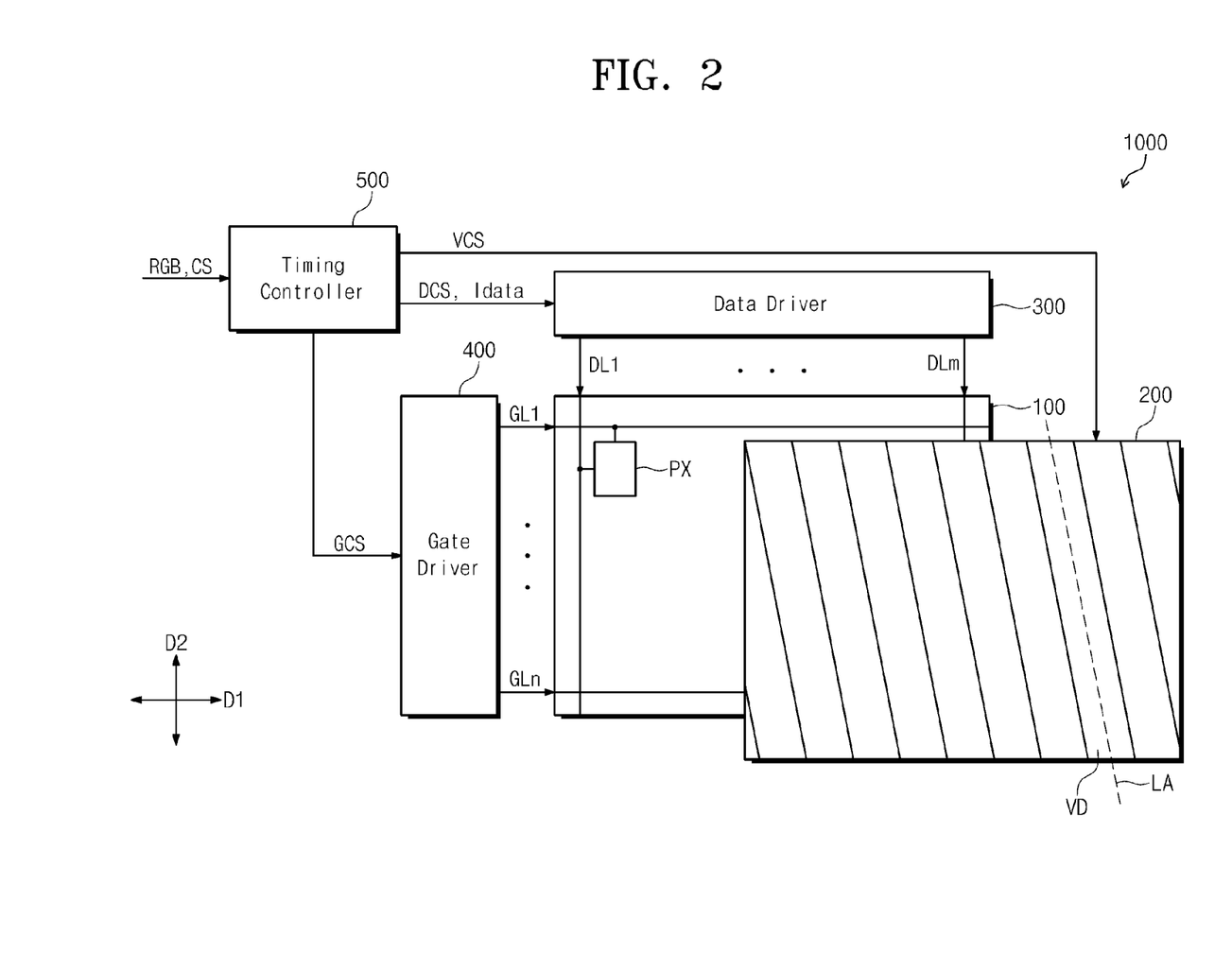
FIG. 2 is a block diagram illustrating a three-dimensional image display device according to an exemplary embodiment of the present invention.

FIG. 2 is a block diagram illustrating the 3D image display device according to an exemplary embodiment of the present disclosure.

Referring to FIG. 2, the 3D image display device 1000 includes data driver 300 and gate driver 400 to drive the display panel 100 and a timing controller 500 to control the drive of the data driver 300 and the gate driver 400.

The timing controller 500 receives image information RGB and control signals CS from outside of the 3D image display device 1000. The timing controller 500 converts a data format of the image information RGB to a data format appropriate to an interface between the data driver 300 and the timing controller 500 and generates image data Idata. The timing controller 500 applies the image data Idata to the data driver 300. The timing controller 500 generates a data control signal DCS, e.g., an output start signal, a horizontal start signal, etc., and a gate control signal GCS, e.g., a vertical start signal, a vertical clock signal, a vertical clock bar signal, etc., on the basis of the control signals CS. The data control signal DCS is applied to the data driver 300, and the gate control signal GCS is applied to the gate driver 400.

The gate driver 400 sequentially outputs gate signals in response to the gate control signal GCS provided from the timing controller 500.

The data driver 300 converts the image data Idata to data voltages in response to the data control signal DCS provided from the timing controller 500. The data voltages are applied to the display panel 100.

The display panel 100 includes a plurality of gate lines GL1 to GLn, a plurality of data lines DL1 to DLm, and a plurality of pixels PX. FIG. 2 shows only one pixel PX as a representative example.

The gate lines GL1 to GLn extend in a first direction D1 and are arranged in a second direction D2 substantially perpendicular to the first direction D1 so as to be substantially in parallel with each other. The gate lines GL1 to GLn are connected to the gate driver 400 and receive the gate signals from the gate driver 400. In FIG. 2, the first and second directions D1 and D2 are respectively substantially parallel to the row and column directions, respectively.

The data lines DL1 to DLm extend in the second direction D2, and are arranged in the first direction D1 to be substantially in parallel with each other. The data lines DL1 to DLm are connected to the data driver 300 and receive the data voltages from the data driver 300.

Each pixel PX includes a thin film transistor (not shown) and a liquid crystal capacitor (not shown), and is connected to a corresponding gate line of the gate lines GL1 to GLn and a corresponding data line of the data lines DL1 to DLm. In more detail, each pixel PX is turned on or turned off in response to the gate signal applied thereto. The turned-on pixels PX display gray-scale values corresponding to the data voltages.

When viewed in a plan view, the viewpoint forming unit 200 has a long axis LA inclined with respect to the column direction and includes one of a plurality of kinds of viewpoint forming devices VD arranged in the row direction. The viewpoint forming devices VD may be lenticular lenses or parallax barriers.

The viewpoint forming unit 200 may be, but is not limited to, a film with the lenticular lens or the parallax barrier. In this case, the 3D image display device 1000 is operated in a 3D mode at all times.

In the present exemplary embodiment, the viewpoint forming unit 200 may be a switching panel configured to switch the operation mode of the 3D image display device 1000 to the 2D mode from the 3D mode, or vice versa.

In detail, when the viewpoint forming unit 200 is turned on, the 2D image output from the display panel 100 is converted to the 3D image, and the viewer recognizes the 3D image. In this case, the 3D image display device 1000 is operated in the 3D mode.

Meanwhile, when the viewpoint forming unit 200 is turned off, the 2D image output from the display panel 100 transmits through the viewpoint forming unit 200 and the viewer recognizes the 2D image. In this case, the 3D image display device 1000 is operated in the 2D mode.

The timing controller 500 applies a viewpoint control signal VCS to the viewpoint forming unit 200. The viewpoint forming unit 200 is operated in response to the viewpoint control signal VCS.

Hereinafter, the display panel 100 operated in the 3D mode will be described in detail.

Various kinds of display panels, e.g., a liquid crystal display panel, an organic light emitting display panel, an electrophoretic display panel, an electrowetting display panel, etc., may be used as the display panel 100.

When the liquid crystal display panel is used as the display panel 100, the 3D image display device 1000 includes a backlight unit (not shown) disposed at a rear side of the display panel 100. The backlight unit supplies a white light to the liquid crystal display panel. In addition, the 3D image display device 1000 may include a pair of polarizers respectively disposed on upper and lower surfaces of the liquid crystal display panel. The polarizers have transmission axes perpendicular to each other.

Figure 3:
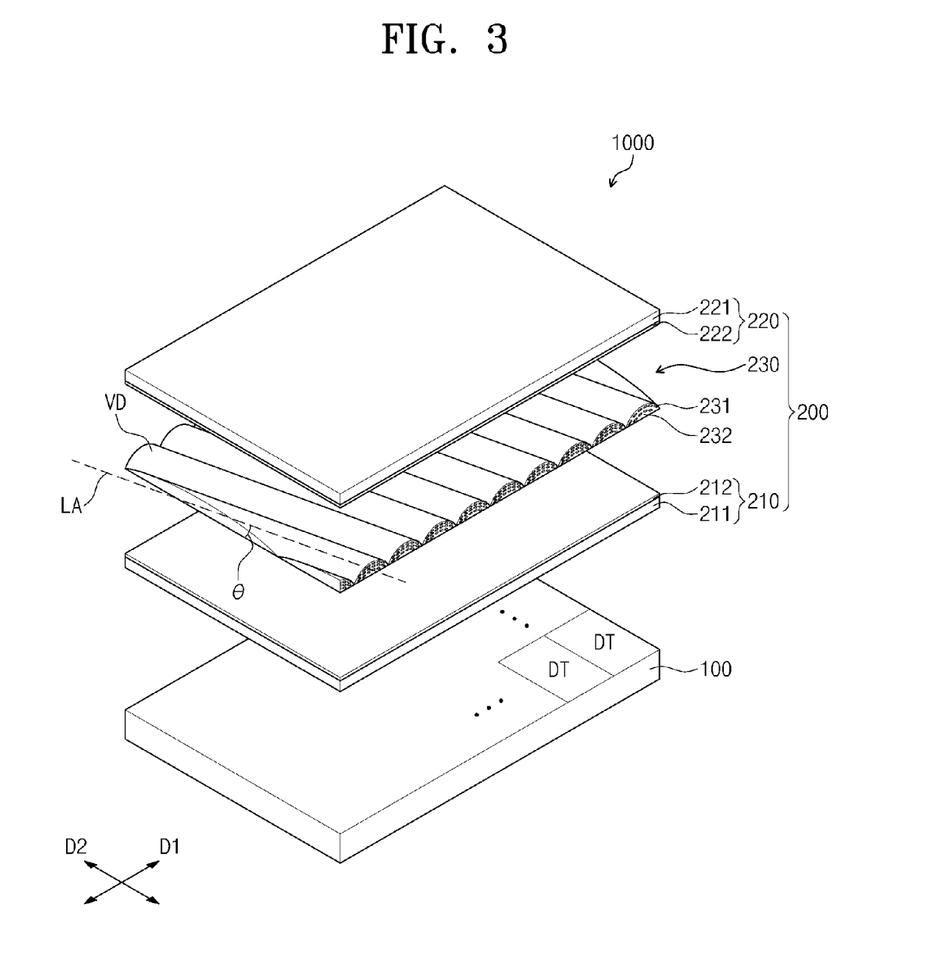
FIG. 3 is an exploded perspective view illustrating the three-dimensional image display device shown in FIG. 2.

FIG. 3 is an exploded perspective view illustrating the 3D image display device 1000 shown in FIG. 2.

Referring to FIG. 3, the viewpoint forming unit 200 includes a first substrate 210, a second substrate 220, and a liquid crystal layer 230 interposed between the first and second substrates 210 and 220. The first substrate 210 includes a first base substrate 211 and a first electrode layer 212 disposed on the first base substrate 211 and the second substrate 220 includes a second base substrate 221 and a second electrode layer 222 disposed on the second base substrate 221. The first and second electrode layers 212 and 222 include a transparent conductive material, e.g., indium tin oxide, indium zinc oxide, etc. The first electrode layer 211 may be patterned, and the second electrode layer 222 may be integrally formed as a single unitary and individual unit.

The liquid crystal layer 230 includes liquid crystal molecules 231. An electric field is formed in the liquid crystal layer 230 by voltages respectively applied to the first and second electrode layers 212 and 222, and thus, an alignment of the liquid crystal molecules of the liquid crystal layer 230 is controlled. The voltages respectively applied to the first and second electrode layers 212 and 222 are controlled by the viewpoint control signal VCS (refer to FIG. 2). The viewpoint forming unit 200 forms the viewpoint forming devices VD (refer to FIG. 2) in response to the viewpoint control signal VCS. In the present exemplary embodiment, the viewpoint forming devices VD may be realized by a plurality of lenticular lenses 232.

Figure 4:
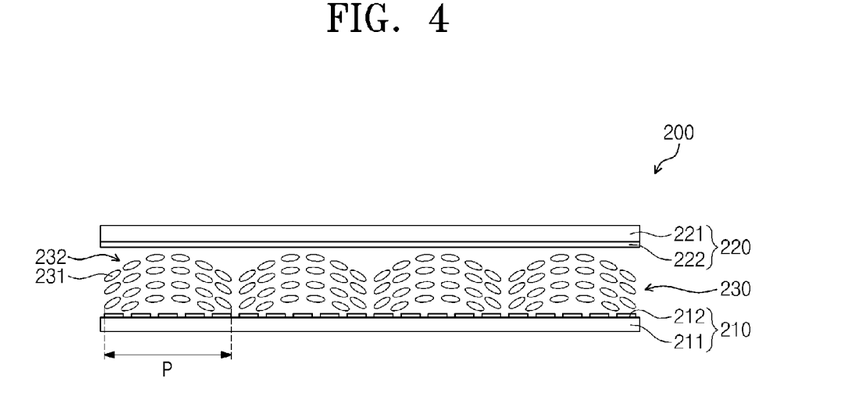
FIG. 4 is a cross-sectional view illustrating a viewpoint forming unit shown in FIG. 3.

FIG. 4 is a cross-sectional view illustrating the viewpoint forming unit 200 shown in FIG. 3.

Referring to FIGS. 3 and 4, when the viewpoint forming unit 200 is operated in the 3D mode, the liquid crystal molecules 231 included in the liquid crystal layer 230 are aligned in a semi-cylindrical shape to form the lenticular lenses 232. The lenticular lenses 232 are arranged in the first direction D1 and extend in a direction inclined with respect to the second direction D2 at an angle ⊖. The lenticular lenses 232 have a long axis LA inclined at the angle ⊖.

When the electric field applied to the liquid crystal layer 230 is controlled, a position of the lenticular lenses 232, a pitch in the row direction of the lenticular lenses 232, and a slope of the long axis LA may be controlled.

To form the lenticular lenses 232 extending in the direction inclined at the angle ⊖, the first electrode layer 212 may have a stripe pattern extending in the direction inclined at the angle ⊖.

Figure 5:
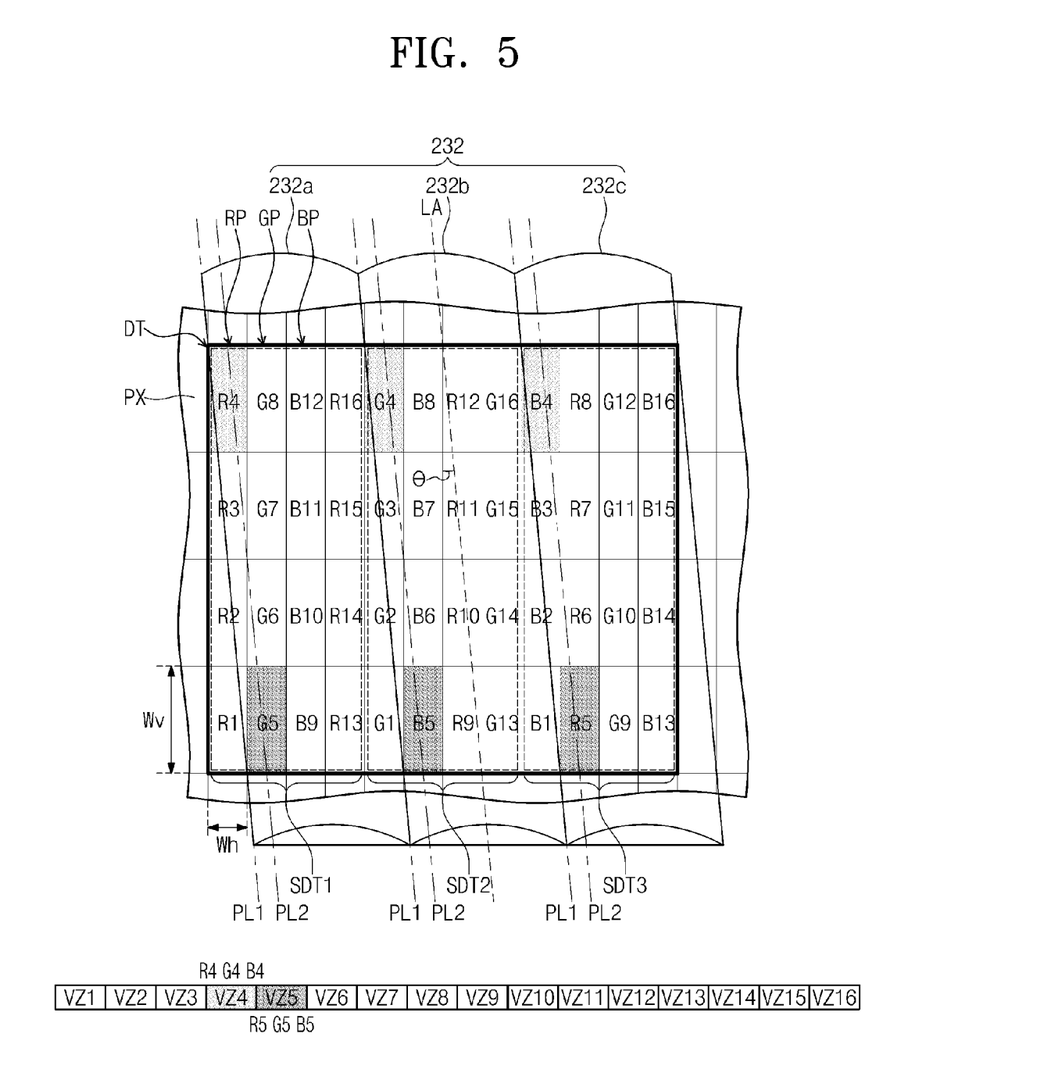
FIG. 5 is a partially enlarged plan view illustrating a portion of a display panel shown in FIG. 3 according to an exemplary embodiment of the present invention.

FIG. 5 is a partially enlarged plan view illustrating a portion of the display panel shown in FIG. 3.

FIG. 5 shows one dot DT among the dots DT shown in FIG. 3, and the pixels PX disposed in the vicinity of the one dot DT is a representative example, since the dots DT have the same structure and function.

The dot DT includes M×N pixels PX arranged in M rows by N columns. As an example, the number of columns N of the dot DT is 12 and the number of rows M of the dot DT is 4. In this case, the dot DT includes forty-eight pixels PX, but the number of columns N of the dot DT and the number of rows M of the dot DT should not be limited thereto.

Each pixel PX has a rectangular shape having a width Wh in the row direction and a width Wv in the column direction. For example, the width Wv in the column direction of each pixel PX may be three times greater than the width Wh in the row direction of each pixel PX. As described above, the dot DT displays the first to k-th viewpoint images 1 to k (refer to FIG. 1). The number of the viewpoint images satisfies the expression $$\frac{(M \times N)}{L}.$$

Here, "L" denotes the number of primary colors required to allow the dot DT to display the 3D image. The number of the primary colors will be described in detail later.

For example, the number kn of viewpoint images may be 16, and in this case, the dot DT displays first to sixteenth viewpoint images projected on the corresponding viewing zone.

Each of the first to sixteenth images is configured to include L color images respectively displaying the L primary colors, and the 3D image display device 1000 (refer to FIG. 1) displays the 3D image having the color of 16 viewpoints using the first to sixteenth viewpoint images. For instance, the color images are configured to include first to third color images that respectively display different primary colors. For example, the number L of the primary colors may be 3.

For example, the first to third color images may be red, green, and blue images to display red, green, and blue colors. Accordingly, each of the first to sixteenth viewpoint images includes the red, green, and blue images, but it should not be limited thereto. That is, the first to third color images may display one of magenta, cyan, yellow, and white colors.

The pixels PX included in the dot DT may be red pixels RP, green pixels GP, or blue pixels BP. For example, the red, green, and blue pixels RP, GP, and BP are repeatedly arranged in the row direction in order of the red, green, and blue pixels RP, GP, and BP.

In the present exemplary embodiment, the red pixels RP display the red image of the first to sixteenth viewpoint images, the green pixels GP display the green image of the first to sixteenth viewpoint images, and the blue pixels BP display the blue image of the first to sixteenth viewpoint images.

The number of each of the red, green, and blue pixels RP, GP, and BP included in the dot DT may be substantially the same as the number kn of the viewpoint images. In more detail, the dot DT includes sixteen red pixels RP, sixteen green pixels GP, and sixteen blue pixels BP.

For example, the dot DT includes first, second, and third sub-dots SDT1, SDT2, and SDT3. The first, second, and third sub-dots SDT1, SDT2, and SDT3 are sequentially arranged in the row direction.

In more detail, the first sub-dot SDT1 includes the pixels PX arranged in first, second, third, and fourth columns of the dot DT. The first sub-dot SDT1 includes eight red pixels RP arranged in the first and fourth columns, each having four red pixels RP, among the sixteen red pixels RP, four green pixels GP arranged in the second column among the sixteen green pixels GP, and four blue pixels BP arranged in the third column among the sixteen blue pixels BP. The red, green, and blue pixels RP, GP, and BP included in the first sub-dot SDT1 display the color images of the different viewpoint images. The color images of the viewpoint images displayed in the first sub-dot SDT1 are projected on different viewing zones.

The second sub-dot SDT2 includes the pixels PX arranged in fifth, sixth, seventh, and eighth columns of the dot DT. In more detail, the second sub-dot SDT2 includes four red pixels RP arranged in the seventh column among the sixteen red pixels RP, eight green pixels GP arranged in the fifth and eighth columns, each having four green pixels PX, among the sixteen green pixels GP, and four blue pixels BP arranged in the sixth column among the sixteen blue pixels BP. The red, green, and blue pixels RP, GP, and BP included in the second sub-dot SDT2 display the color images of the different viewpoint images. The color images of the viewpoint images displayed in the second sub-dot SDT2 are projected on different viewing zones.

The third sub-dot SDT3 includes the pixels PX arranged in ninth, tenth, eleventh, and twelfth columns of the dot DT. In more detail, the third sub-dot SDT3 includes four red pixels RP arranged in the tenth column among the sixteen red pixels RP, four green pixels GP arranged in the eleventh column among the sixteen green pixels GP, and eight blue pixels BP arranged in the ninth and twelfth columns, each having four blue pixels BP, among the sixteen blue pixels BP. The red, green, and blue pixels RP, GP, and BP included in the third sub-dot SDT3 display the color images of the different viewpoint images. The color images of the viewpoint images displayed in the third sub-dot SDT3 are projected on different viewing zones.

The number of columns N of the dot DT may become a multiple of three because the red, green, and blue pixels RP, GP, and BP are repeatedly arranged in each row of the dot DT in the unit of one pixel, in order to allow the dot DT to realize the color image using the red, green, and blue colors.

The N pixels PX are arranged in the row direction in the dot DT, and thus a width Wp in the row direction of the dot DT is obtained by multiplying the width Wh by the number N of the pixels PX. For example, because the number N of columns of the dot DT is twelve, the width Wp of the dot DT is obtained by multiplying 12 by the width Wh.

The dot DT is covered by the lenticular lenses 232. The pitch P of each of the lenticular lenses 232 satisfies the following Equation 1:

$$O < P \le \frac{N \cdot Wh}{L} \quad \text{Equation 1}$$

In the present exemplary embodiment, because the dot DT displays the 3D image having the color using the three primary colors, e.g., red, green, and blue colors, the number L of the primary colors is three and the pitch P is obtained by multiplying four by the width Wh. In other words, the pitch P of each of the lenticular lenses 232 corresponds to a sum of the widths Wh in the column direction of the four pixels PX.

The angle Θ of the long axis LA of each of the lenticular lenses 332 satisfies the following Equation 2:

$$\tan\theta = \frac{b \times Wh}{a \times Wv} \quad \text{Equation 2}$$

In Equation 2, "Wv" denotes the width in the column direction of the pixel PX, and each of "a" and "b" is a natural number. In the present exemplary embodiment, the "a" and "b" may be determined to satisfy the expression $$\frac{b}{a} = \frac{1}{4}.$$

As shown in FIG. 5, a plurality of projection lines, which are substantially parallel to the long axis LA and arranged in the row direction, are defined in each of the lenticular lenses 232. For the convenience of explanation, only the first and second projection lines PL1 and PL2 corresponding to the fourth and fifth viewing zones VZ4 and VZ5 will be described in detail, and details of the others will be omitted. Portions of the dot DT, which are mainly overlapped with the first and second projection lines PL1 and PL2, are refracted by the lenticular lenses 232 at a specific angle and projected on the fourth and fifth viewing zones VZ4 and VZ5.

The red, green, and blue pixels RP, GP, and BP of the dot DT display the viewpoint images of a viewpoint number corresponding to the projection lines overlapped with the red, green, and blue pixels RP, GP, and BP. For instance, the red pixel RP arranged in a first row and a first column of the dot DT, the green pixel GP arranged in the first row and a fifth column of the dot DT, and the blue pixel BP arranged in the first row and a ninth column of the dot DT, which are mainly overlapped with the first projection line PL1, respectively display the red, green, and blue images R4, G4, and B4 of the fourth viewpoint image.

Accordingly, the red, green, and blue images R4, G4, and B4 of the fourth viewpoint image are projected on the fourth viewing zone VZ4 by the lenticular lenses 232. In more detail, the red image R4 of the fourth viewpoint image is projected on the fourth viewing zone VZ4 by a first lenticular lens 232a of the lenticular lenses 232, the green image G4 of the fourth viewpoint image is projected on the fourth viewing zone VZ4 by a second lenticular lens 232b of the lenticular lenses 232, and the blue image B4 of the fourth viewpoint image is projected on the fourth viewing zone VZ4 by a third lenticular lens 232c of the lenticular lenses 232.

In addition, the green pixel GP arranged in a third row and a second column of the dot DT, the blue pixel BP arranged in the third row and a sixth column of the dot DT, and the red pixel RP arranged in the third row and a tenth column of the dot DT, which are mainly overlapped with the second projection line PL2, respectively display green, blue, and red images G5, B5, and R5 of the fifth viewpoint image.

Therefore, the red, green, and blue images R5, G5, and B5 of the fifth viewpoint image are projected on the fifth viewing zone VZ5 by the lenticular lenses 232. In more detail, the green image G5 of the fifth viewpoint image is projected on the fifth viewing zone VZ5 by the first lenticular lens 232a of the lenticular lenses 232, the blue image B5 of the fifth viewpoint image is projected on the fifth viewing zone VZ5 by the second lenticular lens 232b of the lenticular lenses 232, and the red image R5 of the fifth viewpoint image is projected on the fifth viewing zone VZ5 by the third lenticular lens 232c of the lenticular lenses 232.

As described above, the number N of columns of the dot DT should not be a multiple of nine such that each of the first, second, and third lenticular lenses 232a, 232b, and 232c projects the red, green, and blue images of the same viewpoint image on the corresponding viewing zones. When the number N of columns of the dot DT is a multiple of nine, only one color image of the red, green, and blue images is projected on each viewing zone since the pixels displaying the same color are disposed with respect to the same projection line of each of the first, second, and third lenticular lenses 232a, 232b, and 232c. As a result, each viewing zone may not display the color image.

In the above-mentioned descriptions, only the fourth and fifth viewpoint images have been described, but red, green, and blue images of the other viewpoint images are projected on corresponding viewing zones by the lenticular lenses 232 in a manner similar to the red, green, and blue images of the fourth and fifth viewpoint images.

In general, the 2D image displayed on the display panel is enlarged in proportion to the pitch of the lenticular lens and projected on the viewing zone. Accordingly, as the pitch of the lenticular lens becomes smaller, the size of unit pixel of the 2D image recognized through the viewing zone becomes smaller. Therefore, the display quality of the 3D image may be improved.

According to the present exemplary embodiment, the lenticular lenses 232, which convert the red, green, blue images of the first to sixteenth viewpoint images displayed in the dot DT, may be designed to have the pitch P corresponding to one-third of the width Wp of the dot. That is, the pitch P of the lenticular lenses 232 is reduced, and thus, the display quality of the 3D image is improved by the lenticular lenses 232.

In addition, because the pixels PX are arranged in a matrix form in the dot DT, non-uniform deterioration of the resolution of the 3D image in the row and column directions may be prevented from being non-uniformly deteriorated.

Figure 6:
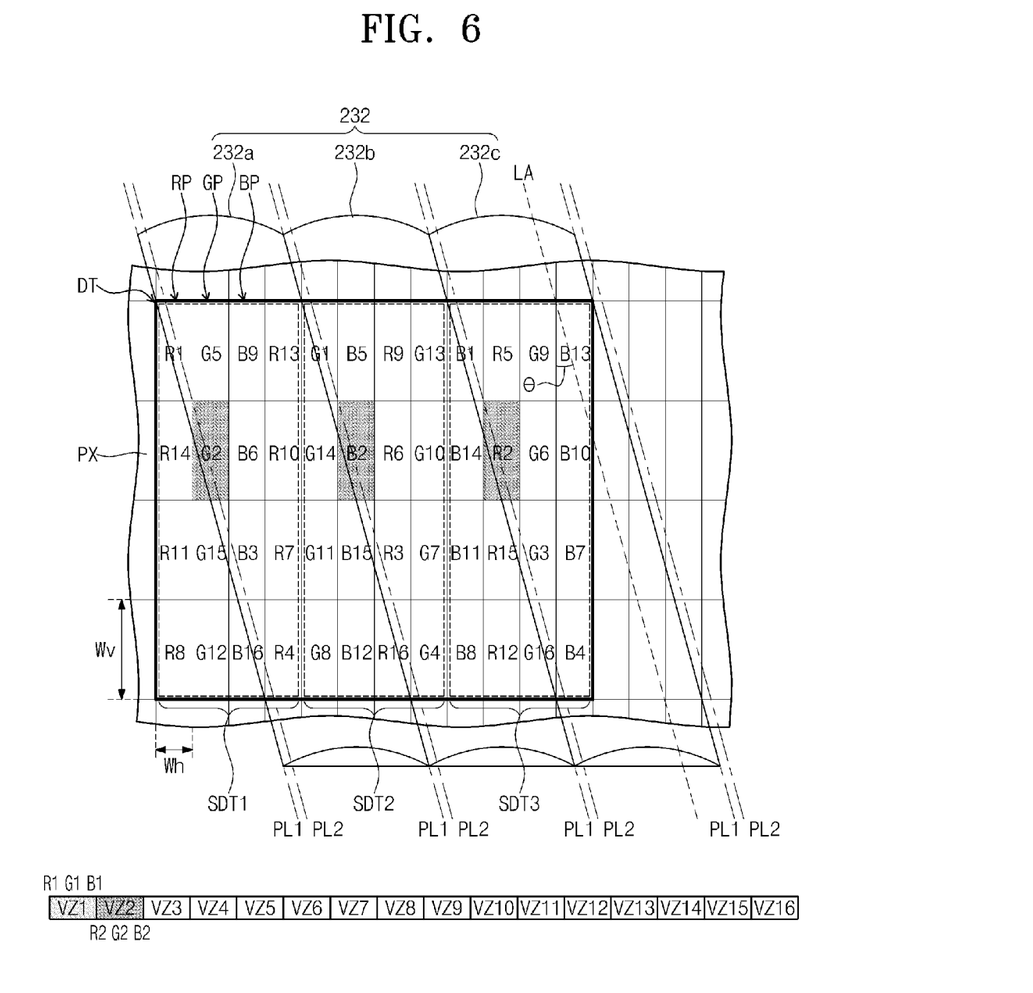
FIG. 6 is a partially enlarged plan view illustrating a portion of a display panel according to another exemplary embodiment of the present invention.

FIG. 6 is a partially enlarged plan view illustrating a portion of a display panel according to another exemplary embodiment of the present disclosure.

Referring to FIG. 6, the "a" and "b" are determined to satisfy the following expression $$\frac{b}{a} = \frac{3}{4}$$

in Equation 2. In this case, the angle ⊖ of the long axis LA of each of the lenticular lenses 232 satisfies the following equation:

$$\tan\theta = \frac{3 \times Wh}{4 \times Wv}$$

As shown in FIG. 6, a plurality of projection lines, which are substantially parallel to the long axis LA and arranged in the row direction, are defined in each of the lenticular lenses 232. For the convenience of explanation, only the first and second projection lines PL1 and PL2, corresponding to the first and second viewing zones VZ1 and VZ2, will be described in detail, and details of the others will be omitted. Portions of the dot DT, which are mainly overlapped with the first and second projection lines PL1 and PL2, are refracted by the lenticular lenses 232 at a specific angle and projected on the first and second viewing zones VZ1 and VZ2.

In more detail, the red pixel RP arranged in a first row and a first column of the dot DT, the green pixel GP arranged in the first row and a fifth column of the dot DT, and the blue pixel BP arranged in the first row and a ninth column of the dot DT, which are mainly overlapped with the first projection line PL1, respectively display red, green, and blue images R1, G1, and B1 of the first viewpoint image.

Accordingly, the red, green, and blue images R1, G1, and B1 of the first viewpoint image are projected on the first viewing zone VZ1 by the lenticular lenses 232. In more detail, the red image R1 of the first viewpoint image is projected on the first viewing zone VZ1 by a first lenticular lens 232a of the lenticular lenses 232, the green image G1 of the first viewpoint image is projected on the first viewing zone VZ1 by a second lenticular lens 232b of the lenticular lenses 232, and the blue image B1 of the first viewpoint image is projected on the first viewing zone VZ1 by a third lenticular lens 232c of the lenticular lenses 232.

In addition, the green pixel GP arranged in a second row and a second column of the dot DT, the blue pixel BP arranged in the second row and a sixth column of the dot DT, and the red pixel RP arranged in the second row and a tenth column of the dot DT, which are mainly overlapped with the second projection line PL2, respectively display green, blue, and red images G2, B2, and R2 of the second viewpoint image.

Therefore, the red, green, and blue images R2, G2, and B2 of the second viewpoint image are projected on the second viewing zone VZ2 by the lenticular lenses 232. In more detail, the green image G2 of the second viewpoint image is projected on the second viewing zone VZ2 by the first lenticular lens 232a of the lenticular lenses 232, the blue image B2 of the second viewpoint image is projected on the second viewing zone VZ2 by the second lenticular lens 232b of the lenticular lenses 232, and the red image R2 of the second viewpoint image is projected on the second viewing zone VZ2 by the third lenticular lens 232c of the lenticular lenses 232.

In the above-mentioned descriptions, only the first and second viewpoint images have been described, but red, green, and blue images of the other viewpoint images are projected on corresponding viewing zones by the lenticular lenses 232, in a manner similar to the red, green, and blue images of the first and second viewpoint images.

Figure 7:
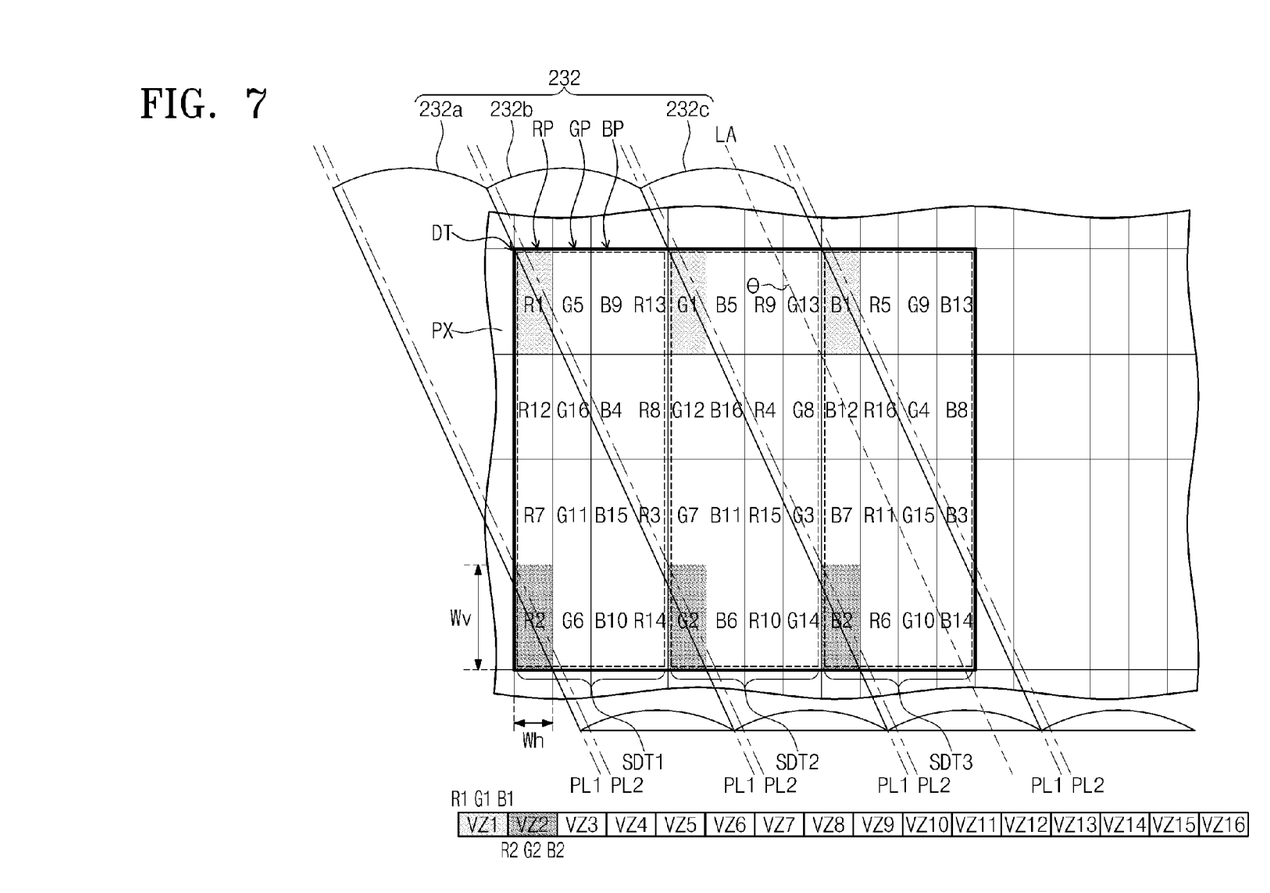
FIG. 7 is a partially enlarged plan view illustrating a portion of a display panel according to another exemplary embodiment of the present invention.

FIG. 7 is a partially enlarged plan view illustrating a portion of a display panel according to another exemplary embodiment of the present disclosure.

Referring to FIG. 7, the "a" and "b" are determined to satisfy the following expression $$\frac{b}{a} = \frac{5}{4}$$

in Equation 2. In this case, the angle ⊖ of the long axis LA of each of the lenticular lenses 232 satisfies the following equation:

$$\tan\theta = \frac{5 \times Wh}{4 \times Wv}.$$

As shown in FIG. 7, a plurality of projection lines, which are substantially parallel to the long axis LA and arranged in the row direction, are defined in each of the lenticular lenses 232. For the convenience of explanation, only the first and second projection lines PL1 and PL2 corresponding to the first and second viewing zones VZ1 and VZ2 will be described in detail, and details of the others will be omitted. Portions of the dot DT, which are mainly overlapped with the first and second projection lines PL1 and PL2, are refracted by the lenticular lenses 232 at a specific angle and projected on the first and second viewing zones VZ1 and VZ2.

In more detail, the red pixel RP arranged in a first row and a first column of the dot DT, the green pixel GP arranged in the first row and a fifth column of the dot DT, and the blue pixel BP arranged in the first row and a ninth column of the dot DT, which are mainly overlapped with the first projection line PL1, respectively display red, green, and blue images R1, G1, and B1 of the first viewpoint image.

Accordingly, the red, green, and blue images R1, G1, and B1 of the first viewpoint image are projected on the first viewing zone VZ1 by the lenticular lenses 232. In more detail, the red image R1 of the first viewpoint image is projected on the first viewing zone VZ1 by a first lenticular lens 232a of the lenticular lenses 232, the green image G1 of the first viewpoint image is projected on the first viewing zone VZ1 by a second lenticular lens 232b of the lenticular lenses 232, and the blue image B1 of the first viewpoint image is projected on the first viewing zone VZ1 by a third lenticular lens 232c of the lenticular lenses 232.

In addition, the green pixel GP arranged in a fourth row and the fifth column of the dot DT, the blue pixel BP arranged in the fourth row and the ninth column of the dot DT, and the red pixel RP arranged in the fourth row and the first column of the dot DT, which are mainly overlapped with the second projection line PL2, respectively display green, blue, and red images G2, B2, and R2 of the second viewpoint image.

Therefore, the red, green, and blue images R2, G2, and B2 of the second viewpoint image are projected on the second viewing zone VZ2 by the lenticular lenses 232. In more detail, the green image G2 of the second viewpoint image is projected on the second viewing zone VZ2 by the second lenticular lens 232b of the lenticular lenses 232, the blue image B2 of the second viewpoint image is projected on the second viewing zone VZ2 by the third lenticular lens 232c of the lenticular lenses 232, and the red image R2 of the second viewpoint image is projected on the second viewing zone VZ2 by the first lenticular lens 232a of the lenticular lenses 232.

In the above-mentioned descriptions, only the first and second viewpoint images have been described, but red, green, and blue images of the other viewpoint images are projected on corresponding viewing zones by the lenticular lenses 232 as similar to the red, green, and blue images of the first and second viewpoint images.

Figure 8:
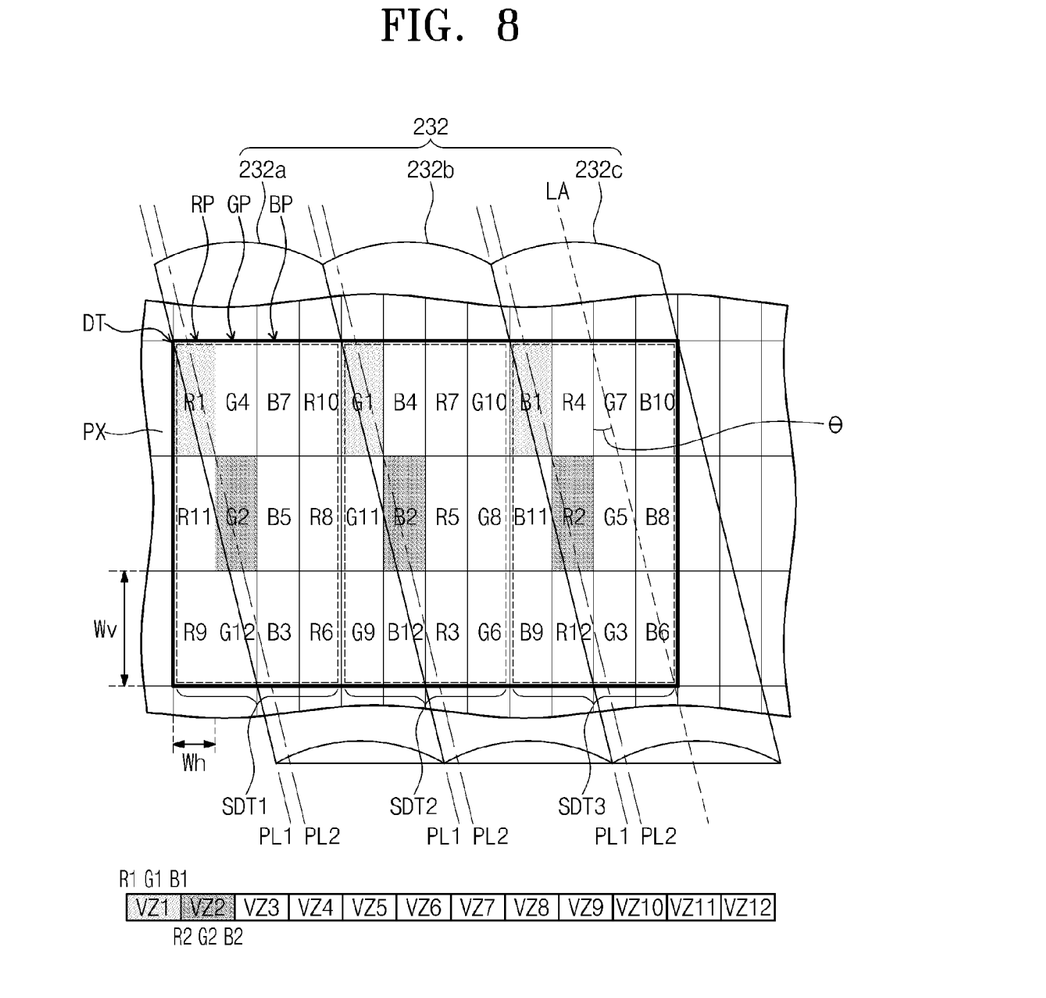
FIG. 8 is a partially enlarged plan view illustrating a portion of a display panel according to another exemplary embodiment of the present invention.

FIG. 8 is a partially enlarged plan view illustrating a portion of a display panel according to another exemplary embodiment of the present disclosure.

Referring to FIG. 8, the number N of columns of the dot DT is twelve, and the number M of rows of the dot DT is three. In this case, the dot DT includes thirty-six pixels PX.

In addition, the number kn of the viewpoint images is twelve, and thus, the dot DT displays first to twelfth viewpoint images projected on corresponding viewing zones.

As an example, the "a" and "b" are determined to satisfy the following expression $$\frac{b}{a} = \frac{2}{3}$$

in Equation 2. In this case, the angle $\ominus$ of the long axis LA of each of the lenticular lenses 232 satisfies the following equation:

$$\tan\theta = \frac{2 \times Wh}{3 \times Wv}$$

As shown in FIG. 8, a plurality of projection lines, which are substantially parallel to the long axis LA and arranged in the row direction, are defined in each of the lenticular lenses 232. For the convenience of explanation, only the first and second projection lines PL1 and PL2 corresponding to the first and second viewing zones VZ1 and VZ2 will be described in detail, and details of the others will be omitted. Portions of the dot DT, which are mainly overlapped with the first and second projection lines PL1 and PL2, are refracted by the lenticular lenses 232 at a specific angle and projected on the first and second viewing zones VZ1 and VZ2.

In more detail, the red pixel RP arranged in a first row and a first column of the dot DT, the green pixel GP arranged in the first row and a fifth column of the dot DT, and the blue pixel BP arranged in the first row and a ninth column of the dot DT, which are mainly overlapped with the first projection line PL1, respectively display red, green, and blue images R1, G1, and B1 of the first viewpoint image.

Accordingly, the red, green, and blue images R1, G1, and B1 of the first viewpoint image are projected on the first viewing zone VZ1 by the lenticular lenses 232. In more detail, the red image R1 of the first viewpoint image is projected on the first viewing zone VZ1 by a first lenticular lens 232a of the lenticular lenses 232, the green image G1 of the first viewpoint image is projected on the first viewing zone VZ1 by a second lenticular lens 232b of the lenticular lenses 232, and the blue image B1 of the first viewpoint image is projected on the first viewing zone VZ1 by a third lenticular lens 232c of the lenticular lenses 232.

In addition, the green pixel GP arranged in a second row and the second column of the dot DT, the blue pixel BP arranged in the second row and a sixth column of the dot DT, and the red pixel RP arranged in the second row and a tenth column of the dot DT, which are mainly overlapped with the second projection line PL2, respectively display green, blue, and red images G2, B2, and R2 of the second viewpoint image.

Therefore, the red, green, and blue images R2, G2, and B2 of the second viewpoint image are projected on the second viewing zone VZ2 by the lenticular lenses 232. In more detail, the green image G2 of the second viewpoint image is projected on the second viewing zone VZ2 by the first lenticular lens 232a of the lenticular lenses 232, the blue image B2 of the second viewpoint image is projected on the second viewing zone VZ2 by the second lenticular lens 232b of the lenticular lenses 232, and the red image R2 of the second viewpoint image is projected on the second viewing zone VZ2 by the third lenticular lens 232c of the lenticular lenses 232.

In the above-mentioned descriptions, only the first and second viewpoint images have been described, but red, green, and blue images of the other viewpoint images are projected on corresponding viewing zones by the lenticular lenses 232 as similar to the red, green, and blue images of the first and second viewpoint images.

Figure 9:
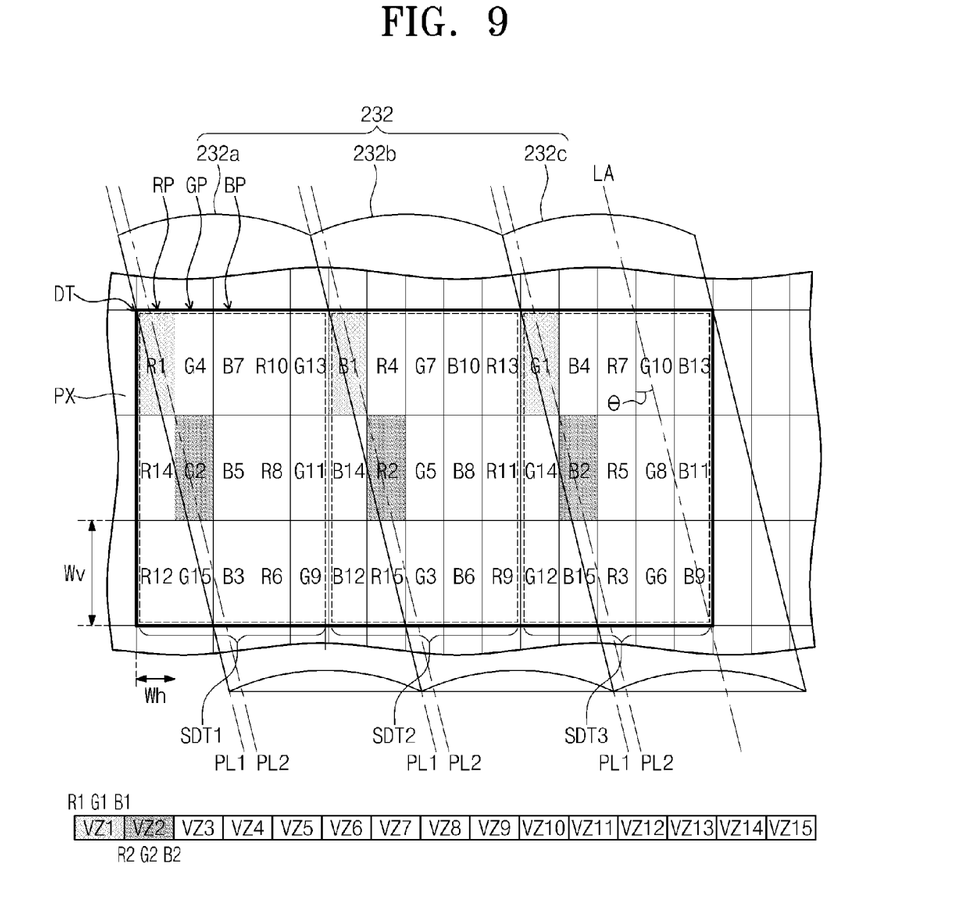
FIG. 9 is a partially enlarged plan view illustrating a portion of a display panel according to another exemplary embodiment of the present invention.

FIG. 9 is a partially enlarged plan view illustrating a portion of a display panel according to another exemplary embodiment of the present disclosure.

Referring to FIG. 9, the number N of columns of the dot DT is fifteen and the number M of rows of the dot DT is three. In this case, the dot DT includes forty-five pixels PX. In addition, the number kn of the viewpoint images is fifteen, and thus, the dot DT displays first to fifteenth viewpoint images projected on corresponding viewing zones.

As an example, the "a" and "b" are determined to satisfy the following expression $$\frac{b}{a} = \frac{2}{3}$$

in Equation 2. In this case, the angle $\ominus$ of the long axis LA of each of the lenticular lenses 232 satisfies the following equation:

$$\tan\theta = \frac{2 \times Wh}{3 \times Wv},$$

and the pitch P of each of the lenticular lenses 232 is obtained by multiplying the width Wh by 5.

As shown in FIG. 9, a plurality of projection lines, which is substantially parallel to the long axis LA and arranged in the row direction, is defined in each of the lenticular lenses 232. For the convenience of explanation, only the first and second projection lines PL1 and PL2 corresponding to the first and second viewing zones VZ1 and VZ2 will be described in detail, and details of the others will be omitted. Portions of the dot DT, which are mainly overlapped with the first and second projection lines PL1 and PL2, are refracted by the lenticular lenses 232 at a specific angle and projected on the first and second viewing zones VZ1 and VZ2.

In more detail, the red pixel RP arranged in a first row and a first column of the dot DT, the green pixel GP arranged in the first row and a fifth column of the dot DT, and the blue pixel BP arranged in the first row and a ninth column of the dot DT, which are mainly overlapped with the first projection line PL1, respectively display red, green, and blue images R1, G1, and B1 of the first viewpoint image.

Accordingly, the red, green, and blue images R1, G1, and B1 of the first viewpoint image are projected on the first viewing zone VZ1 by the lenticular lenses 232. In more detail, the red image R1 of the first viewpoint image is projected on the first viewing zone VZ1 by a first lenticular lens 232a of the lenticular lenses 232, the blue image B1 of the first viewpoint image is projected on the first viewing zone VZ1 by a second lenticular lens 232b of the lenticular lenses 232, and the green image G1 of the first viewpoint image is projected on the first viewing zone VZ1 by a third lenticular lens 232c of the lenticular lenses 232.

In addition, the green pixel GP arranged in a second row and the second column of the dot DT, the blue pixel BP arranged in the second row and a sixth column of the dot DT, and the red pixel RP arranged in the second row and a tenth column of the dot DT, which are mainly overlapped with the second projection line PL2, respectively display green, blue, and red images G2, B2, and R2 of the second viewpoint image.

Therefore, the red, green, and blue images R2, G2, and B2 of the second viewpoint image are projected on the second viewing zone VZ2 by the lenticular lenses 232. In more detail, the green image G2 of the second viewpoint image is projected on the second viewing zone VZ2 by the first lenticular lens 232a of the lenticular lenses 232, the blue image B2 of the second viewpoint image is projected on the second viewing zone VZ2 by the second lenticular lens 232b of the lenticular lenses 232, and the red image R2 of the second viewpoint image is projected on the second viewing zone VZ2 by the third lenticular lens 232c of the lenticular lenses 232.

According to the above, the lenticular lenses are disposed in one dot, and thus, the color images of the viewpoint images displayed in the one dot are projected on the viewing zones corresponding to viewpoint numbers of the viewpoint images. Therefore, the pitch in the row direction of the lenticular lenses is reduced and the display quality of the 3D images is improved. In addition, because the one dot includes the pixels arranged in a matrix form, non-uniform deterioration in the resolution of the 3D image in the row direction and in the column direction may be prevented.

In the above-mentioned descriptions, only the first and second viewpoint images have been described, but red, green, and blue images of the other viewpoint images are projected on corresponding viewing zones by the lenticular lenses 232 as similar to the red, green, and blue images of the first and second viewpoint images.

Although certain exemplary embodiments and implementations have been described herein, other embodiments and modifications will be apparent from this description. Accordingly, the inventive concept is not limited to such embodiments, but rather to the broader scope of the presented claims and various obvious modifications and equivalent arrangements.

What is claimed is:

1. A three-dimensional image display device comprising:
   a display panel comprising a dot including M×N pixels arranged in M rows by N columns, displaying kn viewpoint images, and configured to display a color image using L primary colors; and
   a viewpoint forming unit comprising L viewpoint forming devices per dot arranged in a row direction and configured to separate the kn viewpoint images at different angles to project the kn viewpoint images on corresponding viewing zones,
   wherein
   each of the viewpoint forming devices has a pitch (P) satisfying the following Equation:

$$O < P \le \frac{N \cdot Wh}{L}$$

in the row direction, where "Wh" indicates a width in the row direction of each of the pixels.

2. The three-dimensional image display device of claim 1, wherein the number (kn) of the viewpoint images satisfies the following Equation:

$$kn = \frac{(M \times N)}{L}.$$

3. The three-dimensional image display device of claim 2, wherein L=3.

4. The three-dimensional image display device of claim 3, wherein N is a multiple of three.

5. The three-dimensional image display device of claim 4, wherein the dot comprises:
   kn red pixels respectively configured to display red images of the kn viewpoint images;
   kn green pixels respectively configured to display green images of the kn viewpoint images; and
   kn blue pixels respectively configured to display blue images of the kn viewpoint images.

6. The three-dimensional image display device of claim 5, wherein the dot further comprises first, second, and third sub-dots sequentially arranged in the row direction, the first sub-dot comprises the pixels arranged in first to $$\left(\frac{N}{3}\right)\text{th columns,}$$

the second sub-dot comprises the pixels arranged in $$\left(\frac{N}{3}+1\right)\text{th to }\left(\frac{2}{3}N\right)\text{th columns,}$$

and the third sub-dot comprises the pixels arranged in $$\left(\frac{2}{3}N+1\right)$$

to N-th columns.

7. The three-dimensional image display device of claim 6, wherein:
   the first sub-dot comprises kn/2 red pixels of the kn red pixels, kn/4 green pixels of the kn green pixels, and kn/4 blue pixels of the kn blue pixels;
   the second sub-dot comprises kn/4 red pixels of the kn red pixels, kn/2 green pixels of the kn green pixels, and kn/4 blue pixels of the kn blue pixels; and
   the third sub-dot comprises kn/4 red pixels of the kn red pixels, kn/4 green pixels of the kn green pixels, and kn/2 blue pixels of the kn blue pixels.

8. The three-dimensional image display device of claim 7, wherein the red, green, and blue pixels are repeatedly arranged in the row direction.

9. The three-dimensional image display device of claim 8, wherein N is not a multiple of nine.

10. The three-dimensional image display device of claim 9, wherein the red pixels, the green pixels, and the blue pixels display different viewpoint images.

11. The three-dimensional image display device of claim 4, wherein each of the viewpoint forming devices comprises a long axis inclined with respect to a column direction of the pixels at an angle (Θ), the angle (Θ) satisfying the following Equation:

$$\tan\theta = \frac{b \times Wh}{a \times Wv},$$

where "Wh" denotes the width in the row direction of each of the pixels, "Wv" denotes a width in the column direction of each of the pixels, and each of "a" and "b" is a natural number.

12. The three-dimensional image display device of claim 11, wherein M=four.

13. The three-dimensional image display device of claim 12, wherein "a" and "b" satisfy the following Equation:

$$\frac{b}{a} = \frac{1}{4}.$$

14. The three-dimensional image display device of claim 12, wherein "a" and "b" satisfy the following Equation:

$$\frac{b}{a} = \frac{3}{4}.$$

15. The three-dimensional image display device of claim 12, wherein "a" and "b" satisfy the following Equation:

$$\frac{b}{a} = \frac{5}{4}.$$

16. The three-dimensional image display device of claim 12, wherein the width (Wh) in the row direction of each of the pixels, and the width (Wv) in the column direction of each of the pixels satisfy the following Equation:

$$Wv = 3 \cdot Wh.$$

17. The three-dimensional image display device of claim 11, wherein N=three.

18. The three-dimensional image display device of claim 17, wherein "a" and "b" satisfy the following Equation:

$$\frac{b}{a} = \frac{2}{3}.$$

19. The three-dimensional image display device of claim 17, wherein N=twelve or fifteen.

20. The three-dimensional image display device of claim 1, wherein the viewpoint forming devices comprise one of a lenticular lens and a parallax barrier.

* * * * *